US006996486B2

(12) United States Patent
Turner

(10) Patent No.: US 6,996,486 B2
(45) Date of Patent: Feb. 7, 2006

(54) VIBRATION INSTRUMENT CALIBRATION METHOD AND APPARATUS

(76) Inventor: Darlene Turner, 3600 Sunbury Rd., Columbus, OH (US) 43219

(*) Notice: Subject to any disclaimer, the term of this patent is extended or adjusted under 35 U.S.C. 154(b) by 0 days.

(21) Appl. No.: 10/629,445

(22) Filed: Jul. 29, 2003

(65) Prior Publication Data

US 2005/0027468 A1 Feb. 3, 2005

(51) Int. Cl.
*G01C 19/00* (2006.01)
*G01D 18/00* (2006.01)
*G01L 25/00* (2006.01)

(52) U.S. Cl. ........................ 702/104; 702/91; 702/105

(58) Field of Classification Search ................ 702/104, 702/85, 91, 105, 121, 56

See application file for complete search history.

(56) References Cited

U.S. PATENT DOCUMENTS 4,408,285 A 10/1983 Sisson et al. ............... 364/508
5,847,259 A 12/1998 Hu ............................ 73/1.01
5,918,191 A * 6/1999 Patel .......................... 702/84
6,334,075 B1 12/2001 Mase et al. .................... 700/9
6,377,894 B1 * 4/2002 Deweese et al. .............. 702/22
6,484,109 B1 11/2002 Lofall ......................... 702/56
6,571,191 B1 * 5/2003 York et al. .................. 702/107
2002/0060247 A1 * 5/2002 Krishnaswamy et al. .................... 235/472.01

FOREIGN PATENT DOCUMENTS

JP 11194162 A * 7/1999

* cited by examiner

*Primary Examiner*—Bryan Bui
*Assistant Examiner*—Meagan S Walling
(74) *Attorney, Agent, or Firm*—David A. Greenlee

(57) ABSTRACT

A method of and apparatus for enabling on-site calibration of an instrument, which measures vibration in a machine to assure that the instrument functions within instrument performance specifications, eliminates the need for shipping the instrument to a remote lab for calibration. In one embodiment a CD containing a database that includes the calibration procedure is provided for use with a laptop computer located on site with the instrument. The laptop is connected to the instrument and the procedure displayed on the laptop is followed to calibrate the instrument. Upon successful completion of the procedure, the laptop is connected to a printer which prints out a certificate of completion of calibration. In an alternative embodiment, the database and procedure are available on a remote computer, which is accessed via an internet connection that is password protected.

10 Claims, 11 Drawing Sheets

1. CONNECT PICKUP CABLE TO UUC 'S INPUT CONNECTOR
CONNECT THE OTHER END, TO PICKUP CONNECTOR ON THE MODEL MMB

2. CONNECT DVM CABLE TO DVM AND THE OTHER END 'BNC TO DVM'

3. CONNECT RS-232 CABLE TO 'RS-232 CONNCTOR'ON THE MODEL DVM' THE OTHER END TO 'RS-232 ON YOUR COMPUTER'

FOLLOW PROCEDURE ON THE COMPUTER

Calibration Results
VIBRATION ANALYSIS LIMITED

PASS

| | | | |
|---|---|---|---|
| UUT: | ICP 328F01 | Result: | PASS |
| | ACELEROMETER | Performed on: | 3/ 1/02 at 12:18:00 |
| | Serial No: 27024 | Performed by: | DARLENE TURNER |
| | Asset No. 991111R | Environment: | Temp. 26.2°C Humid. 37 % |
| | | Condition F/L: | FOUND-LEFT |
| | | Procedure Completed: | |

Notes:

EXAMPLE

Standards Used

| Asset | Mfg | Model | Description | Cal. Date | Due Date |
|---|---|---|---|---|---|
| VALTE106 | FLUKE | 87 | DVM | 10-Sep-01 | 10-Sep-02 |
| 0074 | DYNAMIC | DI-803 | TRANSDUCER TESTER | 11-Apr-01 | 11-Apr-02 |
| 9901163 | ENTEK/IRD | 970 | STANDARD TRANSDUCER | 19-Jan-02 | 17-Jan-03 |
| 9904138 | ENTEK/IRD | 544 | STANDARD TRANSDUCER | 19-Jan-02 | 17-Jan-03 |

Test Data

| TEST# | STD PARAMETER | TRUE VALUE | UNIT UNDER TEST READING | TOLERANCE | UUT ERROR | | NOTIFY TUR | USER |
|---|---|---|---|---|---|---|---|---|
| | TOLERANCE +/- 10% READING IN ACC. | | | | | | | |
| | 15.0 Hz test | | | | | | | |
| 1 | 100mv @ 10Hz | | 103 | | 3.2mv | 31 | | |
| | 50.0 Hz test | | | | | | | |
| 2 | 100mv @ 50Hz | | 106 | | 6.2mv | 58 | | |
| | 100.0 Hz test | | | | | | | |
| 3 | 100mv @ 100Hz | | 107 | | 6.9mv | 65 | | |
| | 500.0 Hz test | | | | | | | |
| 4 | 100mv @ 500Hz | | 107 | | 6.9mv | 65 | | |
| | 1000.0 Hz test | | | | | | | |
| 5 | 100mv @ 1000Hz | | 107 | | 7.1mv | 66 | | |

End of Test Data

FIG.5

CME

Calibration Results
GRB ENTERPRISE

UUT: FLUKE 87
DVM
Serial No: VALTE106
Asset No. VALTE106

Result: FAIL
Performed on: 8/ 1/03 at 09:52:00
Performed by: Carlos R. Hill
Environment: Temp. 23.5°C Humid. 40 %
Condition F/L: FOUND-LEFT
Procedure Completed:

FAIL

Notes:

EXAMPLE

Standards Used

| Asset | Mfg | Model | Description | Cal. Date | Due Date |
|---|---|---|---|---|---|

Test Data

| TEST# | STD PARAMETER | TRUE VALUE | READING | UNIT UNDER TEST TOLERANCE | UUT ERROR | ERROR in (% of Tol) | TUR | NOTIFY USER |
|---|---|---|---|---|---|---|---|---|
| 1 | Asset # or Serial # of MODEL MMB | | | | | | | |
| 1 | | | | | | | | |
| 1 | ABCD1234 | | | | | | | |
| 1 | | | | | | | | |
| 1 | | | | | | | | |
| 1 | 05/10/03 | | | | | | | |
| 1 | | | | | | | | |
| 1 | | | | | | | | |
| 1 | Asset # or Serial # of Transducer 1 | | | | | | | |
| 1 | | | | | | | | |
| 1 | H3456789 | | | | | | | |
| 1 | | | | | | | | |
| 1 | | | | | | | | |
| 1 | Asset # or Serial # of Transducer 1 | | | | | | | |
| 1 | | | | | | | | |
| 1 | 544 | | | | | | | |
| 1 | | | | | | | | |
| 1 | | | | | | | | |
| 1 | Asset # or Serial # of Transducer 2 | | | | | | | |
| 1 | | | | | | | | |
| 1 | G123456 | | | | | | | |
| 1 | | | | | | | | |
| 1 | | | | | | | | |
| 1 | Asset # or Serial # of Transducer 2 | | | | | | | |
| 1 | | | | | | | | |
| 1 | 544 | | | | | | | |
| 1 | | | | | | | | |
| 1 | | | | | | | | |
| | BATT SIGNAL CHECK | | | | | | | |
| 1 | Result of Operator Evaluation | | | | | PASS | | |
| | READING IN DISP | | | | | | | |
| | 100.0 Hz test | | | | | | | |
| | .9 to 1.0 | | | | | | | |
| 2 | Result of Operator Evaluation | | | | | PASS | | |
| 3 | AC 0.015 V | | | | | | | |
| | 50.0 Hz test | | | | | | | |

End of Test Data

[redacted]

FIG.6

VIBRATION ANALYSIS LIMITED

3600 SUNBURY RD.
COLUMBUS, OH 43219
1-800-350-4988
614-476-0740
FAX:614-476-0784
www.vibrationanalysis.net Certificate of Calibration

DRAFT

EXAMPLE

For Instrument: ICP 328F01

Description ACELEROMETER

Asset Number: 991111P Serial Number 27012

VIBRATION ANALYSIS LIMITED TESTING SERVICES HEREBY CERTIFIES THAT: the above described instrument met or exceeded all published specifications at the time of calibration specified below; and has been calibrated using standards whose accuracies are traceable to the National Institute of Standards and Technology (NIST) within the limitations of the Institute's calibration services, or have been derived from accepted values or physical constants, or have been derived by ratio or self calibration techniques. All test are performed with a TUR(Test Uncertainty Ratio) of 4:1 unless otherwise specified. All calibration activities performed are in compliance with ANSI/NCSL Z540, ISO/GUIDE 25, AND MIL-STD-45662A.

CALIBRATION INFORMATION

Cal Date Time 3/ 1/02 14:20:00 Temperature 28.20°C Company [redacted]
Next Cal Due 2/28/03 Humidity 37 % Address
C/S/Z
Pass Y Tech DARLENE TURNER PO#
Seals OK Y Note Cal Procedure ICP ACCELEROMETER Revision 1.0

| Std. Asset Number | Mfg | Model | Description | Cal. Date | Due Date |
|---|---|---|---|---|---|
| VALTE108 | FLUKE | 87 | DVM | 9/10/01 | 9/10/02 |
| 0074 | DYNAMIC | DI-803 | TRANSDUCER TESTER | 4/11/01 | 4/11/02 |
| 9901163 | ENTEK/IRD | 970 | STANDARD TRANSDUCER | 1/19/02 | 1/17/03 |
| 9904138 | ENTEK/IRD | 544 | STANDARD TRANSDUCER | 1/19/02 | 1/17/03 |

FIG. 7

Signed: ____

This certification shall not be reproduced, except for in full, without the written permission of VIBRATION ANALYSIS LIMITED.

GRB ENTERPRISE

<report substitution mt_user1>
<report substitution mt_user2>

Failed Calibration Report DRAFT

EXAMPLE

For Instrument: FLUKE 87

Description DVM

Asset Number: VALTE106 Serial Number VALTE106

GRB ENTERPRISE hereby certifies that...
the above described instrument met or exceeded all published specifications at the time of calibration specified below; and has been calibrated using standards whose accuracies are traceable to the National Institute of Standards and Technology (NIST) within the limitations of the Institute's calibration services, or have been derived from accepted values or physical constants, or have been derived by ratio or self calibration techniques. All calibration activities performed are in compliance with MIL-STD-45662A.

CALIBRATION INFORMATION

Cal Date Time 5/28/03 04:22:00 Temperature 23.60°C Shop
Next Cal Due 5/28/03 Humidity 40 % Work Order Pass I Tech Carlos R. Hill
Seals OK Y Note Cal Procedure CME IRD 810 TEST 1(544) Revision 1.0

STANDARDS USED FOR CALIBRATION

| Asset Number | Mfg | Model | Description | Cal. Date | Due Date |
|---|---|---|---|---|---|

FIG.8

EXAMPLE

Final Validated Calibration Results
GRB ENTERPRISE

UUT: ENTEKIRO DATAPAC 1600
DATA COLLECTOR
Serial No: 9909398
Asset No. 080

Result: PASS
Performed on: 12/10/01 at 18:13:00
Performed by: DARLENE TURNER
Environment: Temp. 28.2°C Humid. 37 %
Condition F/L: FOUND-LEFT
Procedure Completed:

Notes:

Standards Used

| Asset | Mfg | Model | Description | Cal. Date | Due Date |
|---|---|---|---|---|---|
| GRBTE1025 | AGILENT | 3458A | 8 1/2 MULTIMETER | 11-Apr-01 | 11-Apr-02 |
| GRBTE1026 | GLOBAL | 108/3120 | GENERATOR | 30-Apr-01 | 30-Apr-02 |

Test Data

| TEST# | STD PARAMETER | TRUE VALUE | UNIT UNDER TEST READING | TOLERANCE | UUT ERROR | ERROR in (% of Tol) | TUR | NOTIFY USER |
|---|---|---|---|---|---|---|---|---|
| 1 | Asset # or Serial # of Transducer | | Model | | | | | |
| 1 | MODEL 9000A-1MV SN# 13120 100MV@100HZ | | | | | | | |
| 1 | Asset # or Serial # of Transducer | | Model | | | | | |
| 1 | READING IN ACC | | | | | | | |
| 1 | 35.4mv @ 10Hz | 10.0 Hz test @ 1.0g | 35.4 | | 0mv | 0 | | |
| 2 | 35.4mv @ 100Hz | 100.0 Hz test @ 1.0g | 35.4 | | 0mv | 0 | | |
| 3 | 35.4mv @ 50Hz | 50.0 Hz test @ 1.0g | 35.6 | | 0.2mv | 5 | | |
| 4 | 35.4mv @ 500Hz | 500.0 Hz test @ 1.0g | 35.6 | | 0.2mv | 5 | | |
| | READING IN G/SE | | | | | | | |
| 5 | 35.4mv @ 10000Hz | 10000.0Hz test @ 1.0g/se | 35.7 | | 0.3mv | 8 | | |
| | READING IN VEL | | | | | | | |
| 6 | 5.75mv @ 10Hz | 10.0 Hz test @ 1.0in/sec | 5.78 | | 0.03mv | 5 | | |
| 7 | 57.5mv @ 100Hz | 100.0 Hz test @ 1.0in/sec | 57.7 | | 0.2mv | 3 | | |
| 8 | 30mv @ 50Hz | 50.0 Hz test @ 1.0in/sec | 31 | | 1mv | 29 | | |
| 9 | 300mv @ 500Hz | 500.0 Hz test @ 1.0in/sec | 302 | | 2.3mv | 7 | | |
| | READING IN MIL | | | | | | | |
| 10 | 8mv @ 50Hz | 50.0 Hz test @ 1.0 MIL | 8 | | -0.02mv | 4 | | |
| 11 | 18.4mv @ 100Hz | 100.0 Hz test @ 1.0 MIL | 18.4 | | 0mv | 0 | | |
| 12 | 478mv @ 500Hz | 500.0 Hz test @ 1.0 MIL | 477 | | 1.8mv | 3 | | |

GRB Enterprise RunTime Report: Calibration Results
ENTEKIRO DATAPAC 1600 Asset No. 080 Serial No: 990
Calibrated on: 12/10/01 at 18:13:00

FIG. 9

GRB ENTERPRISE

FINAL VALIDATED
*Certificate of Calibration*

EXAMPLE

3600 SUNBURY RD.
COLUMBUS, OH 43219
614-476-6839
1-800-350-4988
FAX:614-476-0784
www.calibrationmadeeasy.com

For Instrument: ENTEK\IRD DATAPAC 1500

Description DATA COLLECTOR

Asset Number: 080 Serial Number 9909396

GRB ENTERPRISE, HEREBY CERTIFIES THAT:
the above described instrument met or exceeded all published specifications at the time of calibration specified below; and has been calibrated using standards whose accuracies are traceable to the National Institute of Standards and Technology (NIST) within the limitations of the Institute's calibration services, or have been derived from accepted values or physical constants, or have been derived by ratio or self calibration techniques. All test are performed with a TUR(Test Uncertainty Ratio) of 4:1 unless otherwise specified. All calibration activities performed are in compliance with ANSI/NCSL Z540, ISO/GUIDE 25, ISO/GUIDE 17025, QS-9000, ISO-9000 AND MIL-STD-45662A

CALIBRATION INFORMATION

Cal Date Time 12/10/01 16:13:00
Next Cal Due 12/10/02

Temperature 26.20°C
Humidity 37 %

Company
Address
C/S/Z
PO#
[redacted]

Pass Y
Seals OK Y

Tech DARLENE TURNER
Note

Cal Procedure IRD MODEL DATAPAC 1500

Revision 1.0

| Std. Asset Number | Mfg | Model | Description | Cal. Date | Due Date |
|---|---|---|---|---|---|
| GRBTE1026 | AGILENT | 3458A | 8 1/2 MULTIMETER | 4/11/01 | 4/11/02 |
| GRBTE1026 | GLOBAL | 105/2120 | GENERATOR | 4/30/01 | 4/30/02 |

Dated Signed: ________ Tested by: ________________

________ Validated by: ________________

________ Approved by: ________________

This certification shall not be reproduced, except for in full, without the written permission of GRB ENTERPRISE

FIG. 10

VIBRATION INSTRUMENT CALIBRATION METHOD AND APPARATUS

BACKGROUND OF THE INVENTION

1. Field of the Invention

This invention relates to calibrating Instruments and, more particularly, to a method and apparatus for on-site calibration of a machine condition monitoring vibration measuring instrument (MCM instrument).

2. Background Art

Owners of MCM instrument conventionally return equipment back to the original equipment manufacturer's (OEM) lab or to a third party calibration lab by one of the many conventional shipping companies (e.g. UPS, FedEx, etc.) to be calibrated to NIST (National Institute of Standards and Technology) standards. This method entails shipping expense, possible shipping damage of the equipment, shipping delays, and backlog delays at the lab, as well as requiring the handling and packaging of the equipment for shipment at both ends. This conventional method is shown in FIG. 11, where experience indicates a 2–5 day delay in shipping at both ends, dependent on distance and type of shipping method used (i.e. ground, next-day air, etc.), plus a backlog delay at the testing lab of 5–14 days.

After receipt of this MCM instrument, the lab performs the calibration using such testing equipment as a Digital Voltmeter (DVM), Signal Generator, Frequency Counter and a shaker table for checking vibration transducers or vibration pickups. This test equipment is very large, not mobile and very expensive. The labs use calibration procedures, which include (a) written instructions on how to connect test cables between the MCM instrument being calibrated and test equipment, and how to connect test cables between the MCM instrument and test equipment; and (b) procedures of data collection of the MCM instrument.

Different calibration methods are used for different makes and models of instrumentation. Data Collection is taken by comparing various amplitude and frequency standards with test equipment readings from the MCM Instrument being calibrated. Amplitude and frequency readings from the MCM instrument is manually written down into a form. If the reading from the MCM instrument is within the Standards, a Calibration Certificate is provided to the owner of the MCM instrument.

After completion of the calibration procedure, the lab returns MCM instrument to the owner by the same shipping method as previous, entailing additional shipping expense, potential shipping damage to the equipment, and added delay, as shown in FIG. 11.

The turnaround time required for this method of calibration the MCM instrument is on the order of 9–24 days total, during which time period, the MCM instrument is unavailable for usage.

It would be desirable to provide a method for calibrating MCM instruments that reduce the time required for calibration, and reduce shipping expense and equipment damage.

SUMMARY OF THE INVENTION

It is an object of this invention to provide a method for calibrating MCM instruments that reduces the time required for calibration, and reduce shipping expense and equipment damage.

In its broadest aspect, this invention provides a method for calibrating vibration measuring equipment that eliminates turn-around time, eliminates shipping damage, and eliminates shipping costs.

In one aspect, this invention features apparatus and a method of enabling on-site calibration of an instrument that measures vibration in a machine to assure that the instrument functions within instrument performance standards, comprising providing a calibration device capable of calibrating the instrument, providing a database having a calibration procedure for said instrument, connecting the calibration device to the instrument while the instrument is on-site, connecting the calibration device to the database, and accessing the calibration procedure in the database to cause the calibration device to calibrate the instrument.

In another aspect, this invention features providing the database on portable storage media, and providing an on-site media access device for enabling the calibration device to access the database on the portable storage media.

In a further aspect, this invention features providing the database at an internet accessible remote site, and providing on-site internet access for connection to the database at the internet-accessible remote site.

These and further objects and features of this invention will become more readily apparent from reading the following detailed description, with reference to the accompanying drawings, in which:

DESCRIPTION OF THE DRAWINGS

FIGS. 1–10 are sequential depictions of MCM instrument calibration according to this invention.

DETAILED DESCRIPTION OF A PREFERRED EMBODIMENT

In accordance with this invention, the owner of machine condition monitoring vibration measuring instrument (MCM instrument) which needs calibration is provided with a calibration 'kit', traceable to NIST. This kit contains the same type of instrumentation used by calibration labs to calibrate MCM instruments shipped to them. Also provided is a calibration procedure on portable storage media, such as a floppy or a CD-ROM, or identification for connectivity to website for connection to a computer having the calibration procedure. The procedure is designed for the MCM specified by the owner. Calibration procedures are available for IRD, Entek-IRD, CSI, SKF and many other OEM's instrumentation. This allows the owner to calibrate vibration data collectors, dedicated vibration analyzers, permanently installed vibration monitoring systems (except non contact pick-ups), and balancing machine instrumentation, and to check instrument transducers with equipment as a system on-site at the owner's place of business.

To obtain access to purchase the instrument specific certification procedures, the equipment owner accesses the provider's internet site and inputs the following information:

Owner's name and address to establish equipment database and provide a customer number, OEM instrument make and model number, MCM serial number, Operational tolerances established by owner if other than to OEM product specifications (to ensure procedures provided and resulting test results are in compliance with ISO/Company Quality Assurance program requirements.

List any transducers used in conjunction with the equipment, and

Choice of CD-ROM or web access to perform the calibration procedure.

After digesting the above information, the calibration certification procedure provider either sends the CD, or provides UserID and password for access to the website computer database, containing the procedure for the specified MCM instrument to the owner. The MCM instrument owner then follows the procedure set forth below and the calibration certification can be completed within 45 minutes or less. This compares to the usual 9–24 days required by using the conventional process of shipping the instrument to the lab for calibration.

Detailed Calibration Procedure:

1. Download the calibration procedure(s) program from provider's website or from the CD onto a laptop computer.

Figure 1:
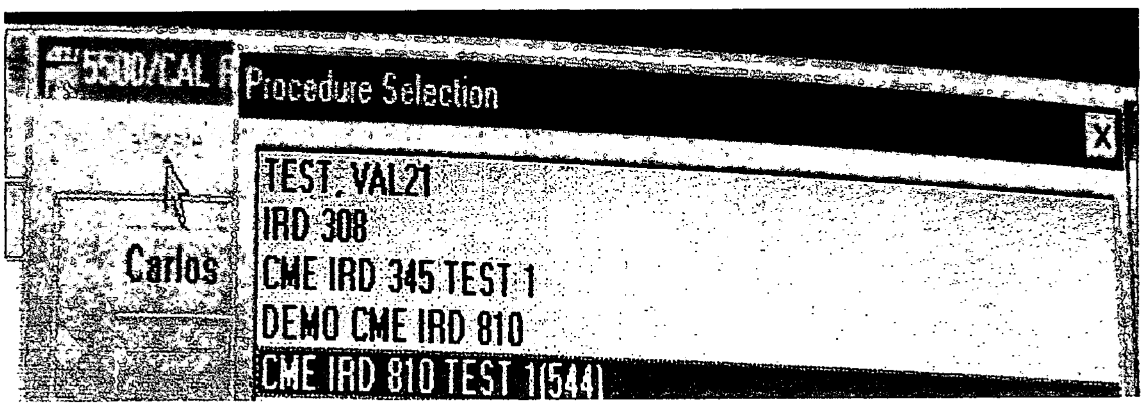

2. Go to "procedure selection" on the program and select the procedure needed for calibration of the specific MCM equipment to be calibrated. See FIG. 1.

Figure 2:
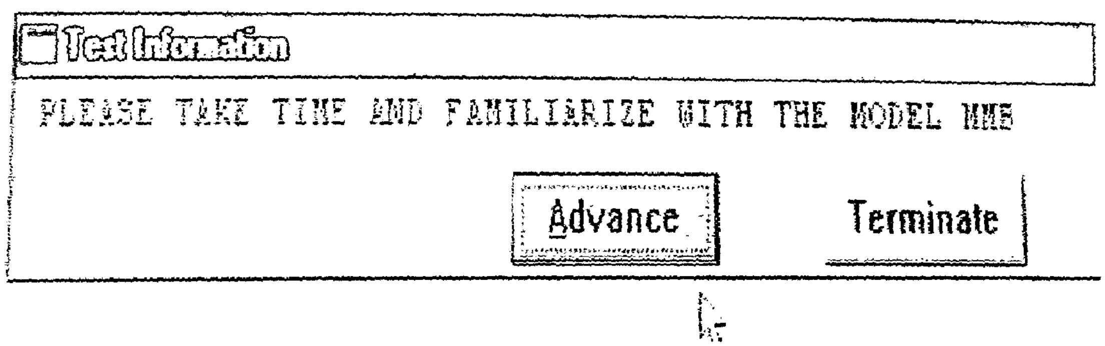
Figure 3:
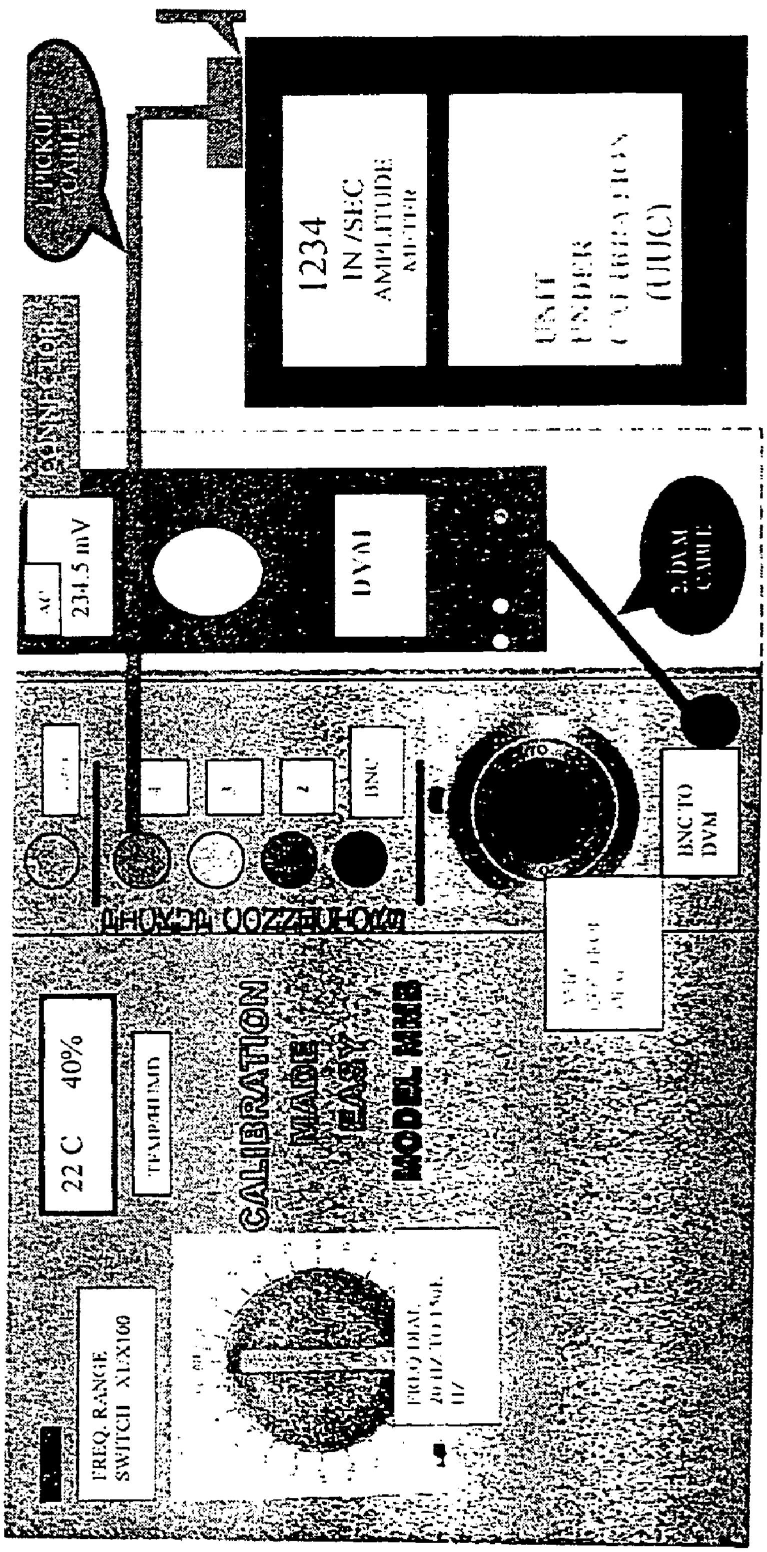

3. Read the test information and click "Advance". See FIG. 2. A picture of the calibration equipment will appear. See FIG. 3.

Figure 4:
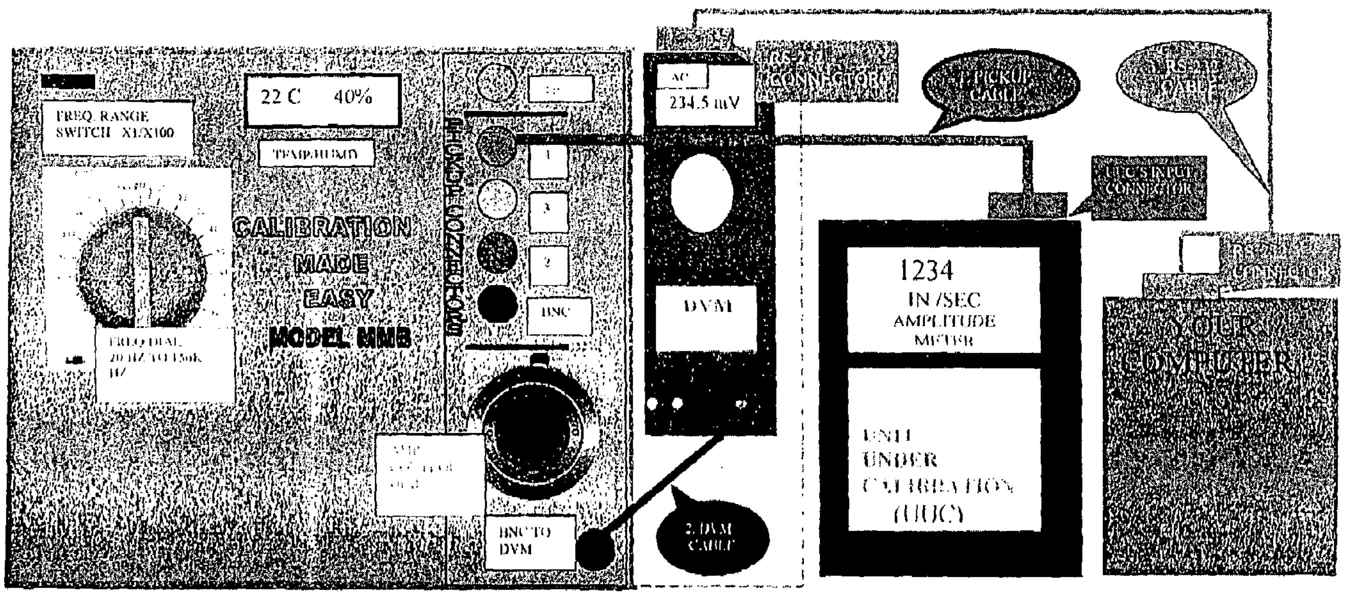
Figure 11:
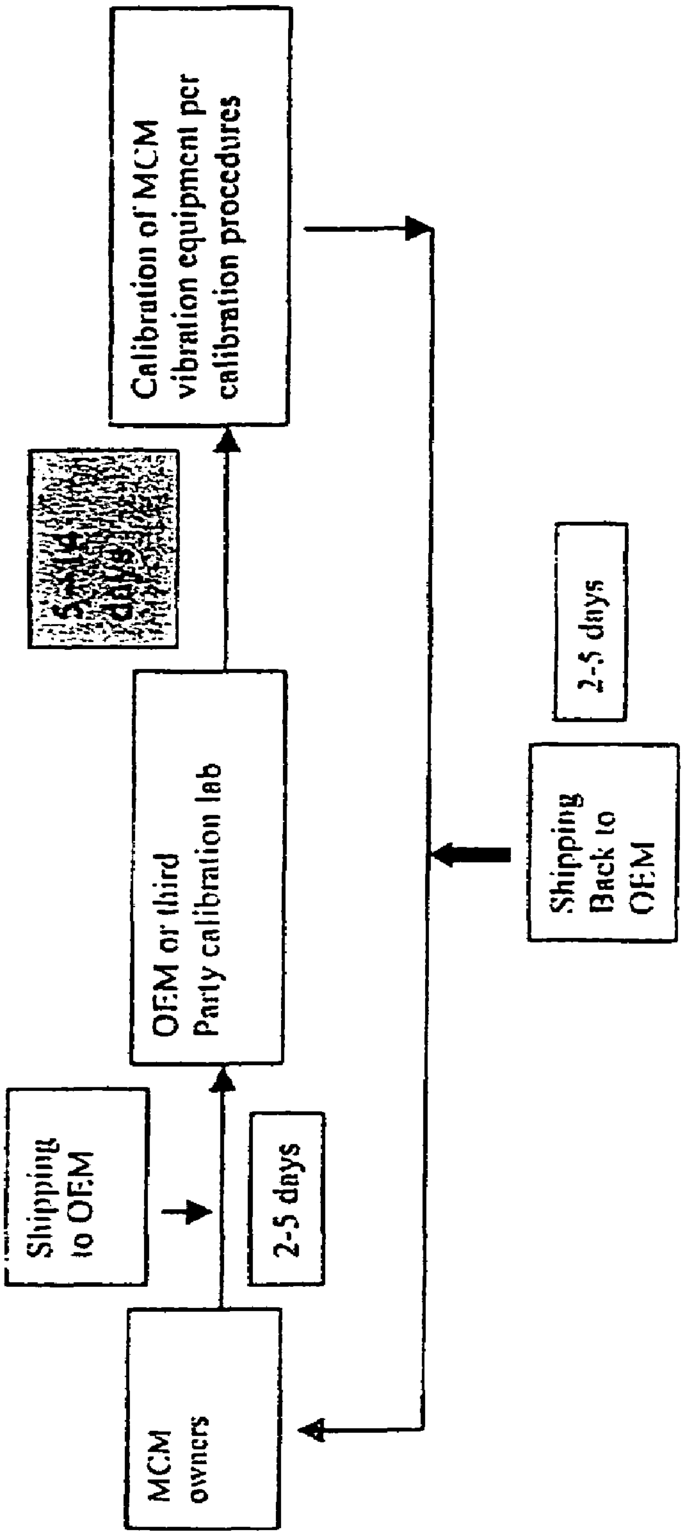
FIG. 11 is a schematic representation of a prior art method of calibrating a vibration measuring instrument

4. Read the test information and click "Advance". A picture of the equipment setup and cable connections will appear, along with procedures and setup information, prompts and questions. See FIG. 4. Click "Advance".

5. The program will then provide prompts to perform the calibration procedures and a number of equipment performance questions, the answers to which are stored in the database. Proceed until completion of the test procedure.

6. If unit under calibration successfully completes test procedure, the program will display a "Calibration Results" screen, stating that the instrument has "passed". See FIG. 5. However, if the instrument unsuccessfully completes the test procedure, the program will display a similar "Calibration Results" screen, stating the instrument has "failed". See FIG. 6. These draft results can then be printed, as can draft "Certificate of Calibration" or a "Failed Calibration Report". See FIGS. 7 and 8.

6. A final validated "Calibration Results" and "Certificate of Calibration", along with a calibration sticker reflecting calibration date and calibration due date, can then be obtained by e-mailing or faxing a copy of the "Draft Calibration Results" and "Certificate of Calibration" to the vendor, where these documents will be reviewed by a qualified technician and given to a quality manager for validation. Thereafter, the final calibration Results and Certificates of calibration, traceable to the NIST standards, and a calibration sticker, as illustrated in FIGS. 9 and 10, will be provided to the instrument owner.

By using this procedure of calibrating a MCM instrument on-site, the instrument owner gains these advantages over using the conventional "ship-back-to-test-lab" procedure:

no more turnaround time
no lost revenue because instrument not available for use
no more lost or damaged instruments
no instrument shipping expense
no more OEM maintenance agreement cost for calibration Even with all these advantages, the owner is still in compliance with quality standards and traceable to NIST.

Although only one preferred embodiment of this invention has been disclosed and described, obvious modifications will become readily apparent from reading this disclosure and are intended to be covered by the appended claims.

I claim:

1. A method of enabling on-site calibration of any of a plurality of instruments that measure vibration in a machine to assure that the instrument functions within instrument performance specifications, comprising the steps of a. providing a calibration device capable of calibrating any of the plurality of said instruments, b. providing a selected one of said instruments that measures vibration of a machine, c. providing a database having a calibration procedure for the selected instrument, d. connecting the calibration device to the selected instrument while the instrument is on-site, e. connecting the calibration device to the database, and f. accessing the calibration procedure for the selected instrument in the database to cause the calibration device to calibrate the selected instrument.

2. The method of claim 1, including the steps of c.1. providing the database on portable storage media, and c.2. providing an on-site media access device for enabling the calibration device to access the database on the portable storage media.

3. The method of claim 1, including the steps of c.1. providing the database at an internet-accessible remote site, and c.2. providing on-site internet access for connection to the database at the internet-accessible remote site.

4. The method of claim 3, including the steps of c.3. providing password-activated access to the remote site database, and c.4. providing a password enabling on-site access to the remote database via the internet.

5. The method of claim 1, including the steps of g. providing on-site means for printing a certificate of calibration, and h. printing said certificate upon successful calibration of the instrument.

6. The method of claim 1, wherein the database includes calibration procedures for a plurality of different instruments.

7. Apparatus comprising a calibration device capable of calibrating any selected one of a plurality of instruments that measure vibrations in machines to assure that said one instrument functions within instrument performance standards, a database having a calibration procedure for any of the plurality of said instruments, means for connecting the calibration device to a selected one of the instruments while the instrument is on-site, means for connecting the calibration device to the database to access the calibration procedure for the selected instrument in the database to cause the calibration device to calibrate the selected instrument.

8. The apparatus of claim 7, including portable media containing the database, and wherein the means for connecting the calibration device to the instrument includes a portable computer for accessing the portable media on-site.

9. The apparatus of claim 7, including a computer located off-site and containing the database, internet access means for accessing the database via the internet, and password-protection means for limiting access to the database via the internet.

10. The apparatus of claim 9, including password protection means limiting access to the off-site computer database.

* * * * *